W. H. VICKERS AND C. E. HANCOCK.
AUTOMATIC WEIGHING MACHINE.
APPLICATION FILED JUNE 9, 1919.
1,338,538.
Patented Apr. 27, 1920.
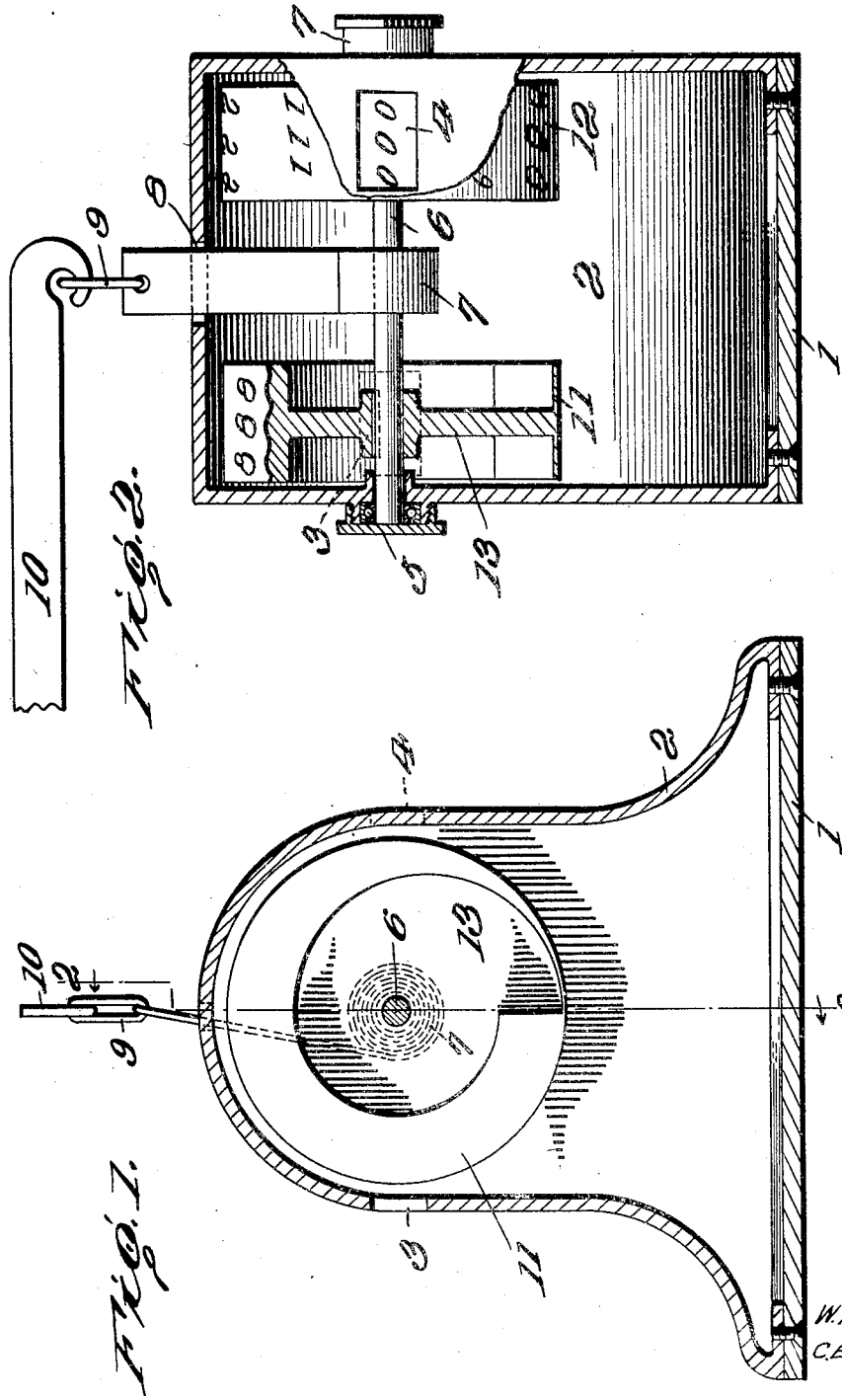
Inventors
W. H. Vickers and
C. E. Hancock.
By [signature] Attorney

UNITED STATES PATENT OFFICE.

WILLIAM H. VICKERS AND CHARLES E. HANCOCK, OF LIBERAL, KANSAS.

AUTOMATIC WEIGHING-MACHINE.

1,338,538.   Specification of Letters Patent.   Patented Apr. 27, 1920.

Application filed June 9, 1919. Serial No. 302,774.

*To all whom it may concern:*

Be it known that we, WILLIAM H. VICKERS and CHARLES E. HANCOCK, citizens of the United States, residing at Liberal, in the county of Seward and State of Kansas, have invented certain new and useful Improvements in Automatic Weighing-Machines, of which the following is a specification, reference being had therein to the accompanying drawing.

This invention relates to certain new and useful improvements in weighing machines and more particularly to the dial and weights, the object being to provide a device which can be readily used in connection with standard scales. Another object of our invention is to provide a dial composed of spaced members carrying weights mounted within a casing having sight openings whereby the user of the scale can read the numerals on the dial from either side of the casing.

A still further object of our invention is to provide a device which is exceedingly simple and cheap in construction and one in which the parts are so mounted that they can be readily reached for repairing the same.

Other and further objects and advantages of the invention will be hereinafter set forth and the novel features thereof defined by the appended claims.

In the drawings,

Figure 1 is a vertical section through our improved construction of weighing machine, and Fig. 2 is a vertical section taken at a right angle to Fig. 1 showing the tape connected to the scale beam.

In carrying out our invention we employ a base 1 on which is mounted a casing 2 provided with sight openings 3 and 4 upon opposite sides thereof, and out of transverse alinement for the purpose hereinafter fully described. The ends of the casing are provided with bearings 5 in which is revolubly mounted a shaft 6, said bearings being preferably ball-bearings as clearly shown, but we do not wish to limit ourselves to the use of any particular construction of bearing. Wound around the shaft 6 is a tape 7, the free end of which extends through an opening 8 formed in the top of the casing and carries a link 9 which is placed over the hooked end of the scale beam 10, as clearly shown in Fig. 2.

Fixed on the shaft 6 adjacent each end of the casing opposite the sight openings 3 and 4 are circular dials 11 and 12 having numerals designating the pounds placed thereon. The numerals on the dial 12 are reverse from the numerals on the dial 11 so that the scale can be read from either side of the casing through the sight openings 3 and 4. The dials 11 and 12 are provided with cam shaped weights 13, and as herein shown the dial and weights are formed integral forming a substantial wheel-shaped member as the weights form the spokes or body portion and the dial the rim, but of course, we do not wish to limit ourselves to the manner of forming the dials and weights in any particular way as they could be formed separate and joined together without departing from the spirit of our invention.

In use the base can be readily placed in position on a standard scale and the tape connected to the beam thereof and the load of the platform will be indicated by the dials which enables the load to be read from either side of the casing.

What we claim is:

1. A weighing machine comprising a base having a casing mounted thereon, said casing being provided with sight openings upon opposite sides, shafts revolubly mounted in said casing, a pair of dials fixed on said shaft opposite said sight openings having numerals designating pounds arranged reverse to one another, said dials being provided with cam-shaped weights and a tape wound around said shaft extending out through said casing having connection with the scale beam.

2. A weighing machine comprising a base having a casing mounted thereon provided with bearings on its ends, a shaft revolubly mounted in said bearings, spaced circular dials fixed on said shaft provided with cam shaped weights, said dials having numerals designating pounds, the numerals on one dial being arranged reverse to the other dial, said casing having sight openings in its sides in alinement with said dials, a tape wound around said shaft between said dials and extending out through the top of said casing, and a scale beam connected to said tape.

In testimony whereof we hereunto affix our signatures in the presence of two witnesses.

WILLIAM H. VICKERS.
CHARLES E. HANCOCK.

Witnesses:
J. H. SALLEY,
F. R. KENNEDY.